(12) United States Patent
Roper

(10) Patent No.: US 11,958,088 B1
(45) Date of Patent: Apr. 16, 2024

(54) ELECTROCHEMICALLY CLEANABLE WINDOWS FOR ATOMIC INSTRUMENTS, AND METHODS OF USING THE SAME

(71) Applicant: HRL Laboratories, LLC, Malibu, CA (US)

(72) Inventor: Christopher S. Roper, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 46 days.

(21) Appl. No.: 17/733,629

(22) Filed: Apr. 29, 2022

Related U.S. Application Data

(60) Provisional application No. 63/217,531, filed on Jul. 1, 2021.

(51) Int. Cl.
| | | |
|---|---|---|
| *B08B 7/00* | (2006.01) | |
| *B23H 3/06* | (2006.01) | |
| *B23H 3/08* | (2006.01) | |

(52) U.S. Cl.
CPC ............. *B08B 7/00* (2013.01); *B23H 3/06* (2013.01); *B23H 3/08* (2013.01)

(58) Field of Classification Search
CPC ............. B08B 7/00; B23H 3/06; B23H 3/08
See application file for complete search history.

(56) References Cited

U.S. PATENT DOCUMENTS 10,828,618 B1 * 11/2020 Roper ................... B01J 19/088

* cited by examiner

*Primary Examiner* — Euncha P Cherry
(74) *Attorney, Agent, or Firm* — O'Connor & Company; Ryan P. O'Connor

(57) ABSTRACT

Some variations provide an atomic instrument configured with an optically transparent and electrochemically cleanable window, comprising: a transparent first electrode; a second electrode with an atom reservoir for first metal ions; an ion conductor interposed between the first electrode and a second electrode, wherein the ion conductor is capable of transporting second metal ions, wherein the ion conductor is in contact with the first electrode and with the second electrode, and wherein the ion conductor is optically transparent; and a transparent window support in contact with the ion conductor, wherein the electrochemically cleanable window is optically transparent, wherein the transparent window support, the ion conductor, and the first electrode collectively form a transparent and electrochemically cleanable window. The disclosed technique removes adsorbed low-vapor-pressure metal thin films from the interior of windows before they become opaque, which extends system lifetime and reduces optical power requirements.

20 Claims, 3 Drawing Sheets

US 11,958,088 B1

ELECTROCHEMICALLY CLEANABLE WINDOWS FOR ATOMIC INSTRUMENTS, AND METHODS OF USING THE SAME

PRIORITY DATA

This patent application is a non-provisional application with priority to U.S. Provisional Patent App. No. 63/217,531, filed on Jul. 1, 2021, which is hereby incorporated by reference herein.

STATEMENT REGARDING FEDERALLY SPONSORED RESEARCH OR DEVELOPMENT

This invention was made with Government support under Contract No. FA8650-19-C-7903 awarded by the U.S. Department of Defense. The Government has certain rights in this invention.

FIELD OF THE INVENTION

The present invention generally relates to atomic instruments, and methods of cleaning atomic instruments. The present invention also relates to transparent, electrochemically cleanable windows that may be used in atomic instruments or other devices.

BACKGROUND OF THE INVENTION

Atomic instruments have importance for many applications, including (but not limited to) atom vapor cells, cold atom systems, atomic clocks, communication system switches and buffers, single-photon generators and detectors, gas-phase sensors, nonlinear frequency generators, precision spectroscopy instrumentation, spectroscopy references, accelerometers, gyroscopes, magnetometers, electrometers, gravitometers, gradiometers (including magnetic gradiometers and gravity gradiometers), quantum memories, molecular-beam epitaxy, atomic-layer deposition, and semiconductor surface doping.

Some atomic species (e.g., Sr and Ca) commonly used in atomic instruments have low vapor pressures and build up over time on the interior surfaces of optical windows for atomic system chambers. The adsorbed or condensed atoms cloud the windows, reducing optical transmission. If window transparency drops, then increasing incident optical power is required in order to realize the same amount of laser power on the inside of the chamber. Higher-laser powers increase system power draw, which is undesirable for compact and portable applications. Furthermore, if deposition of low-vapor-pressure metals continues, windows can turn completely opaque, thereby preventing any further atomic physics operations (e.g., measurements).

Transparent windows are needed in atomic physics to direct laser beams at atomic vapors for cooling, state selection, and spectroscopy, for example. Transparent windows are also needed for the creation of atomic vapors, such as from light-induced atomic adsorption. See Anderson et al., "Loading a vapor-cell magneto-optic trap using light-induced atom desorption", *Physical Review A*, Vol. 63, No. 2 (2001), which is incorporated by reference. Another need for transparent windows in the creation of atomic vapors relates to laser-vaporized alkaline earth sources. See Kock et al., "Laser controlled atom source for optical clocks", Scientific Reports. 6:37321 (2016), which is incorporated by reference.

One conventional technique to overcome atomic species from clouding transparent windows is to heat the windows, such as by heating the entire chamber. However, this solution requires electrical power, which is undesirable for portable and compact applications. Also, the elevated temperature increases the speed of the atoms in the vapor phase of the chamber, making the atoms harder to trap and cool.

Another conventional technique to overcome atomic species from clouding transparent windows is to physically baffle the windows from the atomic sources. However, this solution only delays the inevitable clouding of the windows. Also, physically baffling does not work when the light must shine directly on the atom source, such as in light-induced atomic adsorption or laser-vaporized alkaline earth sources.

In view of the needs in the art and the shortcomings of the known solutions, what is desired is a technique to remove adsorbed low-vapor-pressure metal thin films from the interior of windows in situ—thereby (a) avoiding the windows becoming opaque, (b) extending system lifetime, and (c) reducing optical power requirements. Such a technique would solve a long-felt need for windows that, during operation, do not eventually become opaque. A solution is needed in Sr and Ca atomic physics instruments, among many other commercial applications.

SUMMARY OF THE INVENTION

The present invention addresses the aforementioned needs in the art, as will now be summarized and then further described in detail below.

The present invention provides an electrochemically cleanable window that may be utilized in an atomic instrument. The present invention also provides an atomic instrument comprising an electrochemically cleanable window.

Some variations provide a transparent and electrochemically cleanable window comprising:
  (a) a first electrode, wherein the first electrode is optically transparent;
  (b) a second electrode that is electrically isolated from the first electrode, wherein the second electrode is or contains an atom reservoir for first metal ions;
  (c) an ion conductor interposed between the first electrode and a second electrode, wherein the ion conductor is capable of transporting second metal ions, wherein the ion conductor is in contact with the first electrode and with the second electrode, and wherein the ion conductor is optically transparent; and
  (d) a transparent window support in contact with the ion conductor, wherein the transparent window support is optically transparent.

In some embodiments, an adsorbed and/or condensed metal is disposed on a surface of the transparent and electrochemically cleanable window, wherein the adsorbed and/or condensed metal comprises the first metal ions, a neutral form of the first metal ions, the second metal ions, a neutral form of the second metal ions, or a combination thereof.

The transparent and electrochemically cleanable window may be configured such that when a voltage is applied between the first electrode and the second electrode, (i) the adsorbed and/or condensed metal is oxidized to the first metal ions and/or the second metal ions, and (ii) the first metal ions and/or the second metal ions are conducted through the ion conductor and into the atom reservoir.

The first metal ions and the second metal ions may be independently selected from the group consisting of alkali metal ions, alkaline earth metal ions, rare earth metal ions, and mercury ions. The second metal ions may be the same as, or different than, the first metal ions.

In some embodiments, such as prior to operation of the transparent and electrochemically cleanable window (e.g., as part of an atomic instrument), the transparent and electrochemically cleanable window does not contain, on a surface thereof, an adsorbed and/or condensed metal comprising the first metal ions, a neutral form of the first metal ions, the second metal ions, a neutral form of the second metal ions, or a combination thereof.

The transparent and electrochemically cleanable window may be optically transparent in one or more wavelength bands selected from infrared, and visible, and ultraviolet. In some embodiments, the transparent and electrochemically cleanable window has a transmission of at least 90% in the one or more wavelength bands.

The first electrode may vary chemically and physically. In some embodiments, the first electrode contains an electrode material selected from the group consisting of indium tin oxide, antimony tin oxide, zinc tin oxide, and combinations thereof. In some embodiments, the first electrode contains monolayer graphene or multilayer graphene. In some embodiments, the first electrode contains a metal microwire network, a metal nanowire network, or a lithographically patterned metal network. In certain embodiments, the first electrode contains a thin metal film with a film thickness selected from about 2 nanometers to about 2000 nanometers, such as from about 10 nanometers to about 200 nanometers, or from about 30 nanometers to about 100 nanometers.

The ion conductor preferably comprises, or consists essentially of, a solid electrolyte. In some embodiments, the solid electrolyte is selected from the group consisting of β-alumina, β"-alumina, NASICON, LISICON, KSICON, chalcogenide glasses, and combinations thereof.

The second electrode may be opaque or optically transparent. In some preferred embodiments, the second electrode is optically transparent. In some embodiments, the second electrode contains a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. In some embodiments, the second electrode is encapsulated by the ion conductor and a reservoir wall.

The transparent and electrochemically cleanable window may be present in an atomic instrument. The atomic instrument may comprise opaque chamber walls. The opaque chamber walls, and the transparent and electrochemically cleanable window (and potentially other wall regions), collectively surround a vapor chamber volume. Preferably, the transparent and electrochemically cleanable window is hermetically sealed with a portion of the opaque chamber walls, i.e. at the interface between the transparent and electrochemically cleanable window and an opaque chamber wall.

In some embodiments, the ion conductor, the first electrode, and the second electrode are mechanically supported by the transparent window support.

Other variations of the invention provide a method of cleaning adsorbed and/or condensed metals from an electrochemically cleanable window, the method comprising:
(a) providing a first electrode, wherein the first electrode is optically transparent;
(b) providing a second electrode that is electrically isolated from the first electrode, wherein the second electrode is or contains an atom reservoir for first metal ions;
(c) providing an ion conductor interposed between the first electrode and the second electrode, wherein the ion conductor is capable of transporting second metal ions, wherein the ion conductor is in contact with the first electrode and with the second electrode, and wherein the ion conductor is optically transparent;
(d) providing a transparent window support in contact with the ion conductor, wherein the transparent window support is optically transparent, wherein the transparent window support, the ion conductor, the first electrode, and the second electrode collectively form an electrochemically cleanable window, and wherein the electrochemically cleanable window is transparent;
(e) exposing the electrochemically cleanable window to a metal vapor, wherein during the exposing, at least some of the metal vapor adsorbs and/or condenses on a surface of the electrochemically cleanable window to generate adsorbed and/or condensed metal vapor, and wherein the adsorbed and/or condensed metal vapor reduces transparency of the electrochemically cleanable window; and
(f) applying a voltage between the first electrode and the second electrode, thereby removing some or all of the adsorbed and/or condensed metal vapor from the electrochemically cleanable window.

The first metal ions and the second metal ions may be independently selected from the group consisting of alkali metal ions, alkaline earth metal ions, rare earth metal ions, and mercury ions. The second metal ions may be the same as, or different than, the first metal ions. The metal vapor may comprise a neutral form of the first metal ions and/or the second metal ions.

In some methods, the adsorbed and/or condensed metal vapor is an occluding thin film disposed on the surface of the electrochemically cleanable window. In certain embodiments, the adsorbed and/or condensed metal vapor is a monolayer or a submonolayer of metal atoms disposed on the surface of the electrochemically cleanable window.

In some methods, in step (f), the adsorbed and/or condensed metal vapor is oxidized to the first metal ions and/or the second metal ions, wherein the first metal ions and/or the second metal ions are conducted through the ion conductor and into the atom reservoir. In certain methods, the adsorbed and/or condensed metal vapor is oxidized to the first metal ions and/or the second metal ions before the adsorbed and/or condensed metal vapor forms a film or monolayer (or submonolayer). Alternatively, or additionally, the adsorbed and/or condensed metal vapor may be removed at essentially the same time as the metal vapor adsorbs and/or condenses on the surface of the electrochemically cleanable window.

In some methods, step (f) removes at least 90% of the adsorbed and/or condensed metal vapor from the electrochemically cleanable window.

In some methods, step (f) maintains the transparency of the electrochemically cleanable window at least at 90% in one or more wavelength bands selected from infrared, visible, and ultraviolet.

Other variations of the invention provide a transparent and electrochemically cleanable window comprising:
(a) a transparent window support, wherein the transparent window support is optically transparent;

(b) an ion conductor in contact with the transparent window support, wherein the ion conductor is capable of transporting metal ions, wherein the ion conductor is optically transparent; and (c) a first electrode in contact with the ion conductor, wherein the first electrode is optically transparent.

In some embodiments, the ion conductor is in contact with a second electrode, wherein the second electrode is electrically isolated from the first electrode, and wherein the second electrode is or contains an atom reservoir for the metal ions or different metal ions.

The metal ions and, if present, the different metal ions may be selected from the group consisting of alkali metal ions, alkaline earth metal ions, rare earth metal ions, and mercury ions.

In some embodiments, the transparent and electrochemically cleanable window is configured such that when a voltage is applied between the first electrode and the second electrode, (i) the adsorbed and/or condensed metal is oxidized to the metal ions and/or the different metal ions, and (ii) the metal ions and/or the different metal ions are conducted through the ion conductor and into the atom reservoir.

In some embodiments, the electrochemically cleanable window is optically transparent in one or more wavelength bands selected from infrared, visible, and ultraviolet. In certain embodiments, the electrochemically cleanable window has a transmission of at least 90% in the one or more wavelength bands.

In some transparent and electrochemically cleanable windows, the first electrode contains an electrode material selected from the group consisting of indium tin oxide, antimony tin oxide, zinc tin oxide, monolayer graphene, multilayer graphene, and combinations thereof.

In some transparent and electrochemically cleanable windows, the first electrode contains a metal microwire network, a metal nanowire network, or a lithographically patterned metal network. In some embodiments, the first electrode contains a thin metal film with a film thickness selected from about 2 nanometers to about 2000 nanometers, such as from about 10 nanometers to about 200 nanometers.

In some transparent and electrochemically cleanable windows, the ion conductor comprises, or consists essentially of, a solid electrolyte. The solid electrolyte may be selected from the group consisting of β-alumina, β"-alumina, NASICON, LISICON, KSICON, chalcogenide glasses, and combinations thereof.

In some embodiments, the second electrode is opaque. In other embodiments, the second electrode is optically transparent. The second electrode may contain a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. The second electrode may be encapsulated by the ion conductor and a reservoir wall.

In preferred embodiments of the transparent and electrochemically cleanable window, the window is hermetically sealed.

In preferred embodiments of the transparent and electrochemically cleanable window, the ion conductor and the first electrode are mechanically supported by the transparent window support. In some embodiments, the second electrode is also mechanically supported by the transparent window support, in addition to the ion conductor and the first electrode being mechanically supported by the transparent window support.

Other variations provide a method of cleaning adsorbed and/or condensed metals from an optically transparent window, the method comprising:

(a) providing an electrochemically cleanable window, wherein the electrochemically cleanable window is optically transparent;

(b) exposing the electrochemically cleanable window to a metal vapor, wherein during the exposing, at least some of the metal vapor adsorbs and/or condenses on the surface of the electrochemically cleanable window to generate adsorbed and/or condensed metal vapor, and wherein the adsorbed and/or condensed metal vapor reduces transparency of the electrochemically cleanable window; and (c) applying a voltage across the electrochemically cleanable window, thereby removing some or all of the adsorbed and/or condensed metal vapor from the electrochemically cleanable window.

In some methods, the adsorbed and/or condensed metal vapor forms a film or monolayer (or submonolayer) that is then removed from the electrochemically cleanable window. Alternatively, or additionally, the adsorbed and/or condensed metal vapor may be oxidized to metal ions before the adsorbed and/or condensed metal vapor forms a film or monolayer (or submonolayer).

In some methods, step (c) removes at least 90% of the adsorbed and/or condensed metal vapor from the electrochemically cleanable window.

In some methods, step (c) maintains the transparency of the electrochemically cleanable window at least at 90% in one or more wavelength bands selected from infrared, visible, and ultraviolet.

In these methods, the electrochemically cleanable window may comprise or consist essentially of:

(a) a transparent window support, wherein the transparent window support is optically transparent;

(b) an ion conductor in contact with the transparent window support, wherein the ion conductor is capable of transporting metal ions, wherein the ion conductor is optically transparent; and (c) a first electrode in contact with the ion conductor, wherein the first electrode is optically transparent.

In certain methods, the ion conductor is in contact with a second electrode, the second electrode is electrically isolated from the first electrode, and the second electrode is or contains an atom reservoir for the metal ions or different metal ions.

BRIEF DESCRIPTION OF THE DRAWINGS

Some variations can be understood by reference to the drawings, which are exemplary and not intended to limit the scope of the invention. The drawings are not drawn to scale. The regions and layers of FIGS. 1 and 2 may be repeated or extended in any dimension. Also, in FIGS. 1 and 2, other regions, layers, and additives may be present, and the depicted structure may be part of a larger system.

DETAILED DESCRIPTION OF EMBODIMENTS OF THE INVENTION

Figure 1:
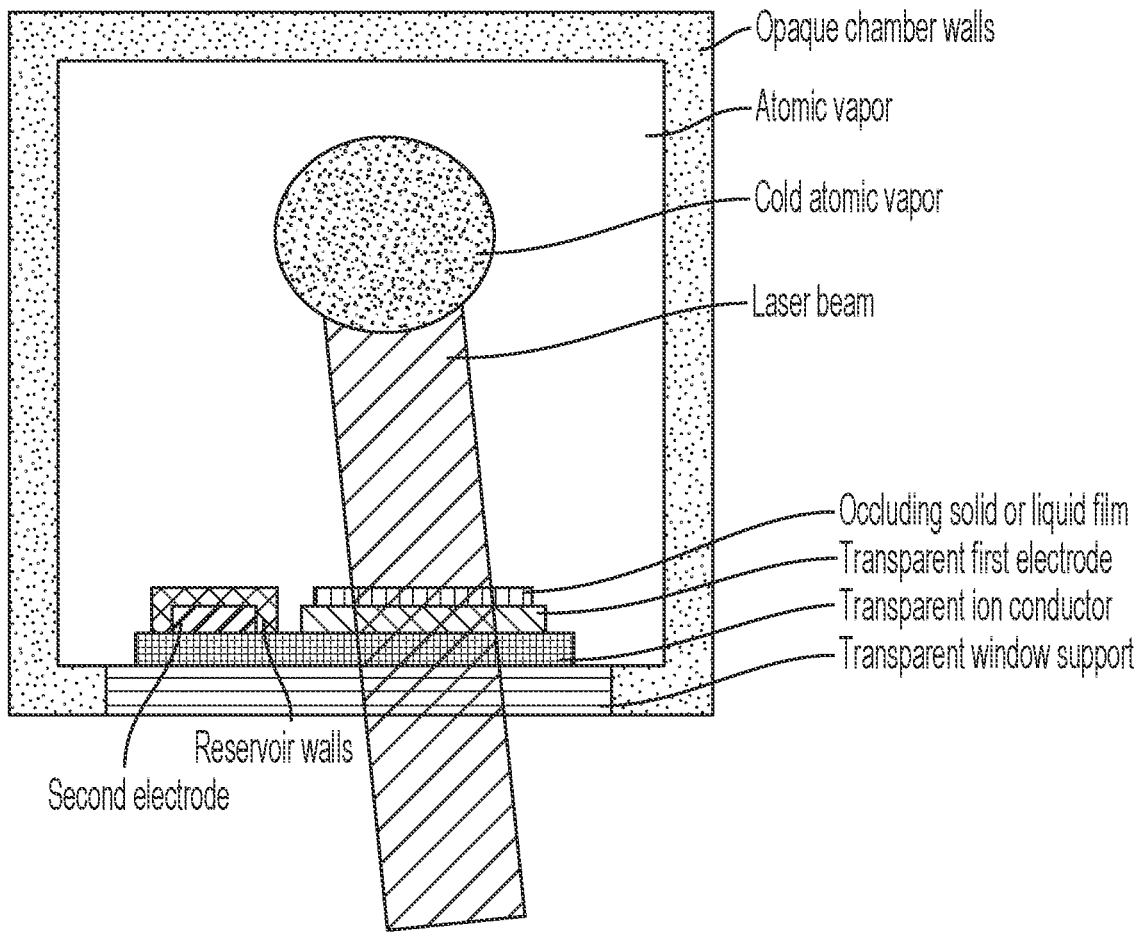
FIG. 1 is an exemplary cross-section schematic of the atomic instrument with an occluding thin film of metal atoms, prior to or during cleaning.

The structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of"(or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention is premised, at least in part, on the design of a transparent device that cleans thin metal films from its surface. The present invention provides an electrochemically cleanable window that may be utilized in an atomic instrument. The present invention also provides an atomic instrument comprising an electrochemically cleanable window. Methods of use are also described.

By removing adsorbed low-vapor-pressure metal thin films from the interior of transparent windows, the windows do not become opaque due to metal thin-film deposition, thus extending system lifetime. Also, optical power requirements are minimized. The optically transparent window utilizes solid-state electrochemistry and a tailored electrode configuration to remove opaque metal deposits from one of its surfaces. The solid-state electrochemistry enables active and in situ cleaning of windows in portable atomic instruments (such as atomic clocks and sensors), thus extending their lifetime.

Some variations provide a transparent and electrochemically cleanable window comprising:
 (a) a first electrode, wherein the first electrode is optically transparent;
 (b) a second electrode that is electrically isolated from the first electrode, wherein the second electrode is or contains an atom reservoir for first metal ions;
 (c) an ion conductor interposed between the first electrode and a second electrode, wherein the ion conductor is capable of transporting second metal ions, wherein the ion conductor is in contact with the first electrode and with the second electrode, and wherein the ion conductor is optically transparent; and
 (d) a transparent window support in contact with the ion conductor, wherein the transparent window support is optically transparent.

In some embodiments, an adsorbed and/or condensed metal is disposed on a surface of the transparent and electrochemically cleanable window, wherein the adsorbed and/or condensed metal comprises the first metal ions, a neutral form of the first metal ions, the second metal ions, a neutral form of the second metal ions, or a combination thereof.

In this disclosure, an "adsorbed and/or condensed" metal means that metal atoms are situated at or near the surface of the electrochemically cleanable window. Adsorbed and/or condensed metal atoms may be in a solid state and/or a liquid state (e.g., some metal atoms in a solid state and some metal atoms in a liquid state). Condensed metal atoms may absorb into the transparent first electrode of the electrochemically cleanable window. There may be metal atoms disposed at the surface that are not condensed to a solid or liquid but rather are chemically or physically adsorbed vapor atoms, or via electrostatic attraction. Metal atoms that otherwise would be in a thermodynamic vapor state, according to the local temperature and pressure, may be situated at the surface at one or more adsorption surface sites. Adsorptions of multiple metal atoms may lead to an occluding thin film that may be more than one metal-atom diameter in thickness (e.g., forming several layers of metal atoms), a monolayer, less than a monolayer, or just one or more individual metal atoms. The average thickness of the adsorbed and/or condensed metal atom layer may be from about 0.1 nm to about 100 nm, such as from about 0.2 nm to about 10 nm, or from about 0.5 nm to about 5 nm. In the case of submonolayers, there are regions at the surface with a thickness of 0, averaged with regions with a thickness greater than 0.

The average lifetime of an adsorbed and/or condensed metal atom may be short due to the oxidation to a metal ion at the transparent first electrode. The oxidation rate may be essentially instantaneous with the adsorption rate, in which case metal atoms are not expected to build up significantly at the surface.

An "electrode" is a region that is electrically conductive or includes one or more material phases that are themselves electrically conductive. The atomic instrument may be configured such that when a voltage is applied between the first electrode and the second electrode, (i) the adsorbed and/or condensed metal is oxidized to the first metal ions and/or the second metal ions, and (ii) the first metal ions and/or the second metal ions are conducted through the ion conductor and into the atom reservoir.

The first metal ions and the second metal ions may be independently selected from the group consisting of alkali metal ions, alkaline earth metal ions, rare earth metal ions, and mercury ions. The second metal ions may be the same as, or different than, the first metal ions.

In some atomic instruments, two types of metal ions are used. For example, one type of metal atom is adsorbed and enters the ion conductor. A second type of metal atom is contained within the ion conductor and the atom reservoir. With this approach, a high-ionic-conductivity metal ion may be used in most of the ion conductor, and metal that forms a low-ionic-conductivity metal ion may be removed from surface.

In some embodiments, such as prior to operation of the atomic instrument, the electrochemically cleanable window does not contain, on a surface thereof, an adsorbed and/or condensed metal comprising the first metal ions, a neutral form of the first metal ions, the second metal ions, a neutral form of the second metal ions, or a combination thereof.

The electrochemically cleanable window may be optically transparent in one or more wavelength bands selected from infrared, visible, or ultraviolet. In some embodiments, the electrochemically cleanable window has a transmission of at least 90% in the one or more wavelength bands. See below for more discussion of wavelength bands and transparency windows (ranges of wavelengths).

The first electrode may vary chemically and physically. In some embodiments, the first electrode contains an electrode material selected from the group consisting of indium tin oxide, antimony tin oxide, zinc tin oxide, and combinations thereof. In some embodiments, the first electrode contains monolayer graphene or multilayer graphene. In some embodiments, the first electrode contains a metal microwire network, a metal nanowire network, or a lithographically patterned metal network. In certain embodiments, the first electrode contains a thin metal film with a film thickness selected from about 2 nanometers to about 2000 nanometers, such as from about 10 nanometers to about 200 nanometers, or from about 30 nanometers to about 100 nanometers.

The ion conductor preferably comprises, or consists essentially of, a solid electrolyte. In some embodiments, the solid electrolyte is selected from the group consisting of β-alumina, β"-alumina, NASICON, LISICON, KSICON, chalcogenide glasses, and combinations thereof.

The second electrode may be opaque or optically transparent. In some preferred embodiments, the second electrode is optically transparent. In some embodiments, the second electrode contains a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. In some embodiments, the second electrode is encapsulated by the ion conductor and a reservoir wall.

The atomic instrument may further comprise opaque chamber walls. The opaque chamber walls, and the electrochemically cleanable window, surround a vapor chamber volume. In addition to the opaque chamber walls and the electrochemically cleanable window, other wall regions may be present, including (but not limited to) non-electrochemically cleanable windows, electrical feedthroughs, sensor regions, etc.

Preferably, the electrochemically cleanable window is hermetically sealed with a portion of the opaque chamber walls, i.e. at the interface between the electrochemically cleanable window and an opaque chamber wall. In similar embodiments, the electrochemically cleanable window is hermetically sealed with a portion of another wall region, such as a non-electrochemically cleanable window.

In certain embodiments, only a portion of a window is electrochemically cleanable. For example, an electrochemical device may be mounted in the center of the window and keep the majority of the window clean, while the periphery of the window is allowed to build up material. This configuration may make it easier to mount the electrochemical device solely on the window and not worry about bridging a dissimilar material junction from the window to the wall.

FIG. 1 is an exemplary cross-section schematic of the atomic instrument with an occluding thin film of metal atoms, prior to or during cleaning. In FIG. 1, there is an atomic vapor contained within a vapor chamber volume defined by opaque chamber walls. An electrochemically cleanable window includes a transparent first electrode disposed on a transparent ion conductor, which in turn is disposed on a transparent window support. A laser beam is directed through the electrochemically cleanable window, to form a cold atomic vapor, which is optional. Multiple laser beams may be directed through the electrochemically cleanable window, if desired. Typically, more than one laser beam is required to form a cold atomic vapor, although with a pyramid magneto-optical trap (MOT) or a grating MOT, a single laser beam may be employed with suitable internal optics. A second electrode, which contains an atom reservoir, is encapsulated by reservoir walls and the ion conductor. The ion conductor, the first electrode, and the second electrode are mechanically supported by the transparent window support.

Figure 2:
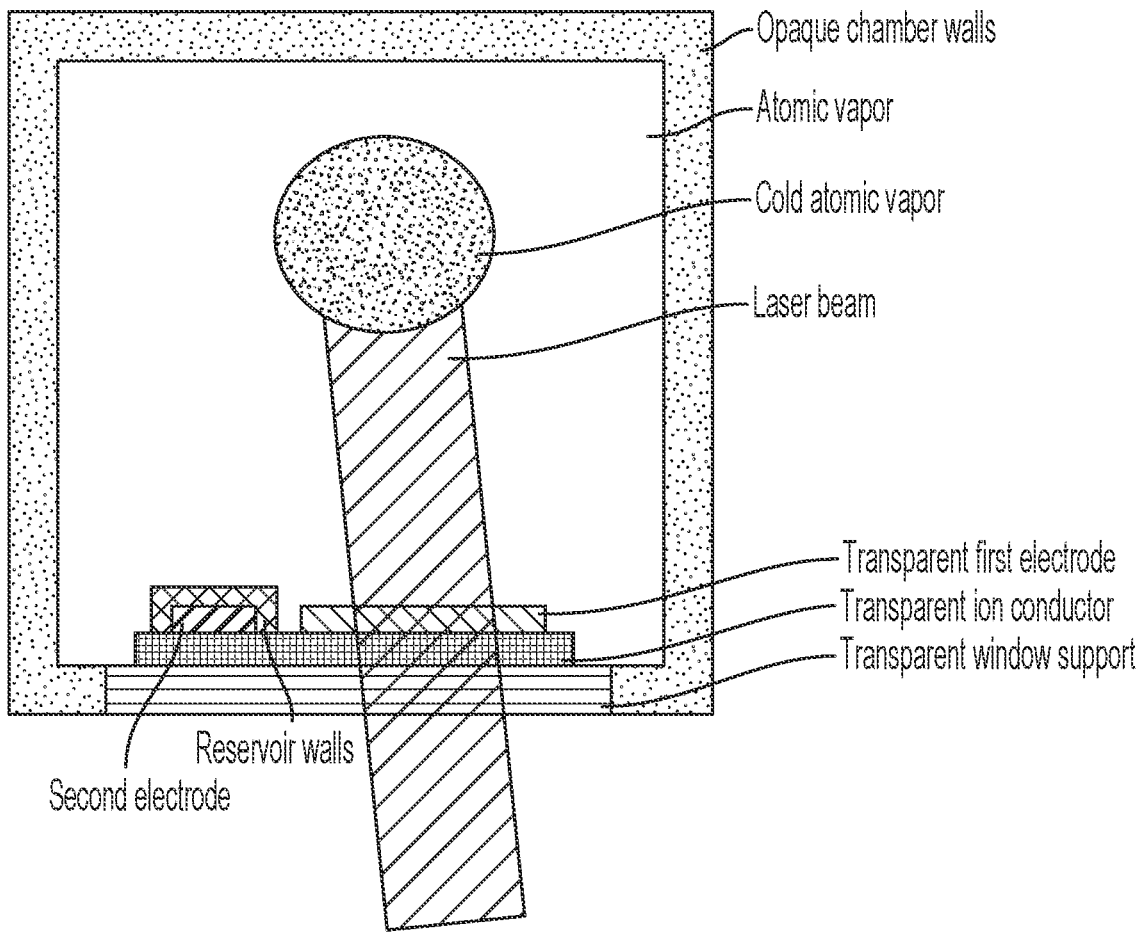
FIG. 2 is an exemplary cross-section schematic of the atomic instrument, following cleaning.

FIG. 2 is an exemplary cross-section schematic of the atomic instrument, following cleaning. In FIG. 2, there is an atomic vapor contained within a vapor chamber volume defined by opaque chamber walls. An electrochemically cleanable window includes a transparent first electrode disposed on a transparent ion conductor, which in turn is disposed on a transparent window support. A laser beam is directed through the electrochemically cleanable window, to form a cold atomic vapor. A second electrode, which contains an atom reservoir, is encapsulated by reservoir walls and the ion conductor. The ion conductor, the first electrode, and the second electrode are mechanically supported by the transparent window support. Compared to FIG. 1, there is no occluding thin film of metal atoms because the thin film has been electrochemically cleaned according to the principles of this disclosure.

Note that prior to operation of the atomic instrument, there is generally no laser beam, atomic vapor, or cold atomic vapor. Following atom loading but prior to measurements, there is generally no laser beam and no cold atomic vapor. Thus, in some embodiments, an atomic instrument is provided as shown in FIG. 2 except that the atomic vapor, the laser beam, and/or the cold atomic vapor may be omitted.

Other variations of the invention provide a method of cleaning adsorbed and/or condensed metals from an electrochemically cleanable window, the method comprising:

(a) providing a first electrode, wherein the first electrode is optically transparent;

(b) providing a second electrode that is electrically isolated from the first electrode, wherein the second electrode is or contains an atom reservoir for first metal ions;

(c) providing an ion conductor interposed between the first electrode and the second electrode, wherein the ion conductor is capable of transporting second metal ions, wherein the ion conductor is in contact with the first electrode and with the second electrode, and wherein the ion conductor is optically transparent;

(d) providing a transparent window support in contact with the ion conductor, wherein the transparent window support is optically transparent, wherein the transparent window support, the ion conductor, the first electrode, and the second electrode collectively form an electrochemically cleanable window, and wherein the electrochemically cleanable window is transparent;

(e) exposing the electrochemically cleanable window to a metal vapor, wherein during the exposing, at least some of the metal vapor adsorbs and/or condenses on a surface of the electrochemically cleanable window to generate adsorbed and/or condensed metal vapor, and wherein the adsorbed and/or condensed metal vapor reduces transparency of the electrochemically cleanable window; and (f) applying a voltage between the first electrode and the second electrode, thereby removing some or all of the adsorbed and/or condensed metal vapor from the electrochemically cleanable window.

Figure 3:
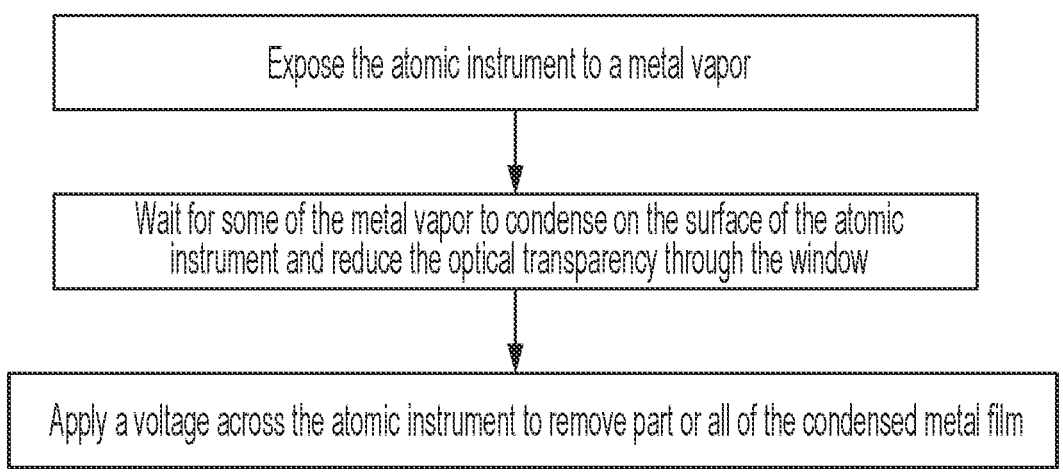
FIG. 3 is an exemplary flowchart describing a method of using a disclosed atomic instrument.

FIG. 3 is an exemplary flowchart describing a method of using a disclosed atomic instrument. In FIG. 3, the step of waiting for some of the metal vapor to condense on the surface of the device and reduce the optical transparency through the window, may involve (a) monitoring the reduction in optical transparency, (b) preemptively maintaining optical transparency, (c) assuming that optical transparency has likely been reduced if a voltage is not applied across the atomic instrument, (d) waiting for a pre-selected amount of operation time, or a combination thereof.

The first metal ions and the second metal ions may be independently selected from the group consisting of alkali metal ions, alkaline earth metal ions, rare earth metal ions, and mercury ions. The second metal ions may be the same as, or different than, the first metal ions. The metal vapor may comprise a neutral form of the first metal ions and/or the second metal ions.

In some embodiments, the adsorbed and/or condensed metal vapor is an occluding thin film disposed on the surface of the electrochemically cleanable window. In certain embodiments, the adsorbed and/or condensed metal vapor is a monolayer or a submonolayer of metal atoms disposed on the surface of the electrochemically cleanable window.

In some methods, in step (f), the adsorbed and/or condensed metal vapor is oxidized to the first metal ions and/or the second metal ions, wherein the first metal ions and/or the second metal ions are conducted through the ion conductor and into the atom reservoir. In certain methods, the adsorbed and/or condensed metal vapor is oxidized to the first metal ions and/or the second metal ions before the adsorbed and/or condensed metal vapor forms a film or monolayer (or submonolayer). Alternatively, or additionally, the adsorbed and/or condensed metal vapor may be removed at essentially the same time as the metal vapor adsorbs and/or condenses on the surface of the electrochemically cleanable window.

In some methods, step (f) removes at least 90% of the adsorbed and/or condensed metal vapor from the electrochemically cleanable window.

In some methods, step (f) maintains the transparency of the electrochemically cleanable window at least at 90% in one or more wavelength bands selected from infrared, visible, and ultraviolet.

Other variations of the invention provide a transparent and electrochemically cleanable window comprising:

(a) a transparent window support, wherein the transparent window support is optically transparent;

(b) an ion conductor in contact with the transparent window support, wherein the ion conductor is capable of transporting metal ions, wherein the ion conductor is optically transparent; and (c) a first electrode in contact with the ion conductor, wherein the first electrode is optically transparent.

In some embodiments, the ion conductor is in contact with a second electrode, wherein the second electrode is electrically isolated from the first electrode, and wherein the second electrode is or contains an atom reservoir for the metal ions or different metal ions.

The metal ions and, if present, the different metal ions may be selected from the group consisting of alkali metal ions, alkaline earth metal ions, rare earth metal ions, and mercury ions.

In some embodiments, the transparent and electrochemically cleanable window is configured such that when a voltage is applied between the first electrode and the second electrode, (i) the adsorbed and/or condensed metal is oxidized to the metal ions and/or the different metal ions, and (ii) the metal ions and/or the different metal ions are conducted through the ion conductor and into the atom reservoir.

In some embodiments, the electrochemically cleanable window is optically transparent in one or more wavelength bands selected from infrared, visible, and ultraviolet. In certain embodiments, the electrochemically cleanable window has a transmission of at least 90% in the one or more wavelength bands.

In some transparent and electrochemically cleanable windows, the first electrode contains an electrode material selected from the group consisting of indium tin oxide, antimony tin oxide, zinc tin oxide, monolayer graphene, multilayer graphene, and combinations thereof.

In some transparent and electrochemically cleanable windows, the first electrode contains a metal microwire network, a metal nanowire network, or a lithographically patterned metal network. In some embodiments, the first electrode contains a thin metal film with a film thickness selected from about 2 nanometers to about 2000 nanometers, such as from about 10 nanometers to about 200 nanometers.

In some transparent and electrochemically cleanable windows, the ion conductor comprises, or consists essentially of, a solid electrolyte. The solid electrolyte may be selected from the group consisting of β-alumina, NASICON, LISICON, KSICON, chalcogenide glasses, and combinations thereof.

In some embodiments, the second electrode is opaque. In other embodiments, the second electrode is optically transparent. The second electrode may contain a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof. The second electrode may be encapsulated by the ion conductor and a reservoir wall.

In preferred embodiments of the transparent and electrochemically cleanable window, the electrochemically cleanable window is hermetically sealed. The electrochemically cleanable window is preferably ultra-high vacuum leak tight. In preferred embodiments, the electrochemically cleanable window seals to the opaque vapor chamber walls.

In preferred embodiments of the transparent and electrochemically cleanable window, the ion conductor and the first electrode are mechanically supported by the transparent window support. In some embodiments, the second electrode is also mechanically supported by the transparent window support, in addition to the ion conductor and the first electrode being mechanically supported by the transparent window support. The transparent window support preferably withstands the pressure difference from vacuum inside the vacuum chamber and ambient air outside.

Other variations provide a method of cleaning adsorbed and/or condensed metals from an optically transparent window, the method comprising:
  (a) providing an electrochemically cleanable window, wherein the electrochemically cleanable window is optically transparent;
  (b) exposing the electrochemically cleanable window to a metal vapor, wherein during the exposing, at least some of the metal vapor adsorbs and/or condenses on the surface of the electrochemically cleanable window to generate adsorbed and/or condensed metal vapor, and wherein the adsorbed and/or condensed metal vapor reduces transparency of the electrochemically cleanable window; and
  (c) applying a voltage across the electrochemically cleanable window, thereby removing some or all of the adsorbed and/or condensed metal vapor from the electrochemically cleanable window.

In some methods, the adsorbed and/or condensed metal vapor forms a film or monolayer (or submonolayer) that is then removed from the electrochemically cleanable window. Alternatively, or additionally, the adsorbed and/or condensed metal vapor may be oxidized to metal ions before the adsorbed and/or condensed metal vapor forms a film or monolayer (or submonolayer).

In some methods, step (c) removes at least 90% of the adsorbed and/or condensed metal vapor from the electrochemically cleanable window.

In some methods, step (c) maintains the transparency of the electrochemically cleanable window at least at 90% in one or more wavelength bands selected from infrared, visible, and ultraviolet.

In some methods, the electrochemically cleanable window may comprise or consist essentially of:
  (a) a transparent window support, wherein the transparent window support is optically transparent;
  (b) an ion conductor in contact with the transparent window support, wherein the ion conductor is capable of transporting metal ions, wherein the ion conductor is optically transparent; and
  (c) a first electrode in contact with the ion conductor, wherein the first electrode is optically transparent.

In certain methods, the ion conductor is in contact with a second electrode, the second electrode is electrically isolated from the first electrode, and the second electrode is or contains an atom reservoir for the metal ions or different metal ions.

In some methods, a device comprising a vacuum chamber is provided. The vacuum chamber contains a source of metal vapor and a transparent, electrochemically cleanable window. The vacuum chamber is sealed. Optionally, the vacuum chamber is heated, before or after loading. The metal vapor is introduced into the vacuum chamber, for purposes of using the device to make a measurement, image, or atom trap, for example. The source of metal vapor may be a SAES dispenser, a pill source, an atom dispenser, a getter, an Alfasource, a bulk condensed form of the metal, a bulk oxidized form of the metal, or a combination thereof, for example. The source of metal vapor may utilize a means of heating the source (e.g., a resistive heater) and/or a means of opening the source to controllably release the metal vapor (e.g., a shutter for a metal vapor).

During operation of the device, some of the metal vapor may condense or adsorb on transparent surfaces and reduce optical transparency through the electrochemically cleanable window, such as by 0.1%, 0.5%, 1%, 2%, 5%, 10%, 15%, 20%, 25%, 30%, 40%, 50%, 60%, 70%, 80%, 90%, 95%, or even 100%.

The metal that condenses or adsorbs may form an occluding solid or liquid thin film, as depicted in FIG. 2. In some embodiments, metal atoms adsorb from the vapor phase and are oxidized at the transparent first electrode before they have a chance to form a thin film or even a monolayer. For example, adsorbed metal atoms may form a submonolayer on the surface of the transparent first electrode. In principle, some metal atoms may be oxidized essentially simultaneously upon adsorption at the surface, forming metal ions that then need to be transported through the transparent first electrode and into the ion conductor.

When the optical transparency has been reduced by a prescribed percentage (e.g., 10% or 50%), or after a certain period of operating time, or a combination thereof, a voltage may be applied across the device to remove some or all of the condensed or adsorbed metal vapor. The transparent first electrode should be at a higher electrical potential than the second electrode. The difference in electrical potentials will oxidize metal atoms at the transparent first electrode, forming metal ions. The metal ions will conduct into and out of the ion conductor. Specifically, the metal ions are transported from the transparent first electrode to the second electrode through the ion conductor, moving from right to left in FIG. 2. At the second electrode, the metal ions may diffuse into the atom reservoir, or the metal ions may be first reduced to metal atoms that diffuse into the atom reservoir of the second electrode.

The voltage applied across the device may be maintained until the optical transparency of the electrochemically cleanable window increases sufficiently, such as back to the initial optical transparency, or to a prescribed optical transparency, such as 90% of the initial optical transparency. Optionally, the voltage may be applied across the device indefinitely as a preventative measure against window occlusion and reduced transparency. Or the voltage may be applied across the device intermittently as a preventative measure against window occlusion and reduced transparency, regardless of actual transparency, e.g. even with minimal or no apparent loss in transparency. An opposite potential (voltage) may be applied to the device when the electrochemically cleanable window is not used to remove condensed or adsorbed metal. The opposite voltage may cause metal atoms to be oxidized at the second electrode to form metal ions, which metal ions diffuse from left to right in FIG. 1 (through the ion conductor) and are deposited at the first electrode as metal atoms. The metal atoms may then evaporated into the vapor phase. This technique may be used to supply a source of metal atoms.

Various embodiments of the atomic instrument will now be further described in even more detail, without limitation.

The ion conductor is transparent at least at one wavelength selected from the infrared, visible, or ultraviolet electromagnetic spectrum. Broadly speaking, the selected wavelength is from about 10 nm to about 1 mm, such as from about 100 nm to about 1000 nm. Preferably, the ion conductor is transparent in one or more selected wavelength bands, referred to as a transparency window (range of wavelengths). The wavelength bands may be in the infrared, visible, or ultraviolet ranges, or overlap (e.g., infrared and visible, or visible and ultraviolet). For typical atom cooling and trapping, the transparency window may be as small as 10 nm. More exotic applications may require a transparency window that is 100 nm or larger. For example, trapping Rb-87 using 1064 nm laser light may require a transparency window of ~300 nm and/or multiple transparency windows that encompass, for example, 1064 nm, 850 nm, 820 nm, and 800 nm. In some embodiments, a transparency window includes a frequency for atomic cloud imaging. In some embodiments, a transparency window includes a frequency for laser cooling.

The optical transmission through the ion conductor in the selected transparency window is preferably at least 80%, and more preferably at least 90%. In various embodiments, the optical transmission through the ion conductor is at least 70%, 75%, 80%, 81%, 82%, 83%, 84%, 85%, 86%, 87%, 88%, 89%, 90%, 91%, 92%, 93%, 94%, 95%, 96%, 97%, 98%, or 99%. The optical transmission depends on the thickness of the ion conductor, generally in an inverse relationship. The thickness of the ion conductor, and the transparency window, are preferably selected together such that the optical transmission is at least 80%, and preferably at least 90%.

The desired transparency may be achieved by making the ion conductor sufficiently thin. Thin ion conductors may be fabricated using subtractive manufacturing, additive manufacturing, or a combination thereof. One subtractive method of making the ion conductor sufficiently thin is chemical mechanical polishing followed by appropriate bakeout of the ion conductor material at suitably high temperature and/or suitably long duration. One additive method of making the ion conductor sufficiently thin is to deposit the ion conductor material conformally on the surface of an inert transparent window support (e.g., alumina or silica) using a deposition process, such as solution deposition or deposition followed by calcination, starting with a hydrated alumina or silica gel.

The thickness of the ion conductor may be selected from about 10 nanometers to about 10 microns, such as from about 10 nanometers to about 1 micron, for example. In various embodiments, the thickness of the ion conductor is about, or at most about 10, 20, 30, 40, 50, 60, 70, 80, 90, 100, 150, 200, 250, 300, 400, 500, 600, 700, 800, or 900 nanometers, including any intervening ranges. In various embodiments, the thickness of the ion conductor is about, or at most about 1, 2, 3, 4, 5, 6, 7, 8, 9, or 10 microns, including any intervening ranges. These thicknesses are the average thickness of the ion conductor.

The ion conductor preferably has high ionic conductivity for an ionic species. The ionic conductivity is preferably at least $10^{-7}$ S/cm, and more preferably at least $10^{-5}$ S/cm for an ionic species (measured at 25° C. or at a device operating temperature). The ionic species is preferably an ionized form of an atom of interest in atomic physics and atomic measurement instruments. The ionic species may be an alkali metal or alkaline earth metal ion, such as one or more of $Li^+$, $Na^+$, $K^+$, $Rb^+$, $Cs^+$, $Sr^{2+}$, and $Ca^{2+}$. Alternatively, or additionally, the ionic species may be a non-alkali and non-alkaline earth metal ion, such as (but not limited to) $Hg^+$, $Hg^{2+}$, $Yb^+$, and/or $Yb^{3+}$. Multiple types of ions may be present in the device. The ionic species is preferably an oxidized form of the atomic vapor, but this need not be the case.

The ion conductor may be a large fraction (at least 50% by weight) β-alumina, β"-alumina, or a combination of β-alumina and β"-alumina. β-alumina and β"-alumina are good conductors of their mobile ions yet allow negligible non-ionic (i.e., electronic) conductivity. β"-alumina is a hard polycrystalline or monocrystalline ceramic material. β-alumina and/or β"-alumina are also referred to herein as "beta-alumina." When prepared as a solid electrolyte, beta-alumina is complexed with a mobile ion, such as $Na^+$, $K^+$, $Li^+$, $Rb^+$, $Cs^+$, $Sr^{2+}$, or $Ca^{2+}$, in which case the solid electrolyte becomes Na-β"-alumina, K-β"-alumina, Li-β"-alumina, Rb-β"-alumina, Cs-β"-alumina, Sr-β"-alumina, or Ca-β"-alumina, respectively.

Other possible solid electrolyte materials for the ion conductor include yttria-stabilized zirconia, NASICON, LISICON, KSICON, alkali-ion-exchanged versions thereof, and combinations of any of the foregoing. In these or other embodiments, chalcogenide glasses may be used as solid electrolyte materials for the ion conductor. Exemplary chalcogenide glasses include, but are not limited to, RbI—GeSe$_2$—Ga$_2$Ge$_3$ and CsI—GeSe$_2$—Ga$_2$Ge$_3$.

The first ion conductor preferably has low electronic conductivity (high electronic resistivity) to avoid an electrical short between the first and second electrodes. The electronic resistivity of the ion conductor is preferably greater than 1 Ω·cm, such as greater than 10 Ω·cm, greater than 100 Ω·cm, greater 1 kΩ·cm, or greater than 10 kΩ·cm, measured at 25° C.

Preferably, when the ion conductor is hygroscopic, the ion conductor is not in contact with ambient air or humid air.

The transparent first electrode is in contact with both the ion conductor and the vapor chamber volume. Both the first electrode and the ion conductor may form part of the inner walls of the vapor chamber (see FIG. 1).

The transparent first electrode permits the conduction of electrons. The transparent first electrode preferably is configured with an electrical connection and feedthrough through the chamber wall.

The transparent first electrode also permits conduction of the same ionic species in the ion conductor, diffusion of a reduced form of the same ionic species in the ion conductor, or a combination thereof.

The transparent first electrode is transparent at least at one optical wavelength selected from the infrared, visible, or ultraviolet electromagnetic spectrum. Broadly speaking, the selected wavelength is from about 10 nm to about 1 mm, such as from about 100 nm to about 1000 nm. Preferably, the transparent first electrode is transparent in one or more selected wavelength bands, referred to as a transparency window (range of wavelengths). The wavelength bands may be in the infrared, visible, or ultraviolet ranges, or overlap (e.g., infrared and visible, or visible and ultraviolet). For typical atom cooling and trapping, the transparency window may be as small as 10 nm. More exotic applications may require a transparency window that is 100 nm or larger. For example, trapping Rb-87 using 1064 nm laser light may transparency require a window of ~Rb-87300 nm and/or multiple transparency windows that encompass, for example, 1064 nm, 850 nm, 820 nm, and 800 nm. In some embodiments, a transparency window includes a frequency for atomic cloud imaging. In some embodiments, a transparency window includes a frequency for laser cooling. The selected transparency window for the transparent first electrode is preferably the same as the selected transparency window for the ion conductor.

The optical transmission through the transparent first electrode in the selected transparency window is preferably at least 90%, and more preferably at least 95%. In various embodiments, the optical transmission through the transparent first electrode is at least 80%, 85%, 90%, 91%, 92%, 93%, 94%, 95%, 96%, 97%, 98%, 99%, or 99.5%. The optical transmission depends on the thickness of the transparent first electrode, generally in an inverse relationship. The thickness of the transparent first electrode, and the transparency window, are preferably selected together such that the optical transmission is at least 90%, and preferably at least 95%.

The transparent first electrode may be a porous and electrically conductive structure. The transparent first electrode may be a selectively permeable and electrically conductive layer. The transparent first electrode may be a mixed ion-electron conductor.

Exemplary transparent electrode materials may be selected from transparent bulk materials, opaque bulk materials that cover a small fraction of the area so as to yield transparency, or a combination thereof. Transparent bulk materials include indium tin oxide (ITO), antimony tin oxide (ATO), zinc tin oxide (ZTO), or a combination thereof, for example. Opaque bulk materials that cover a small fraction of the area to yield transparency include metallic microwire and nanowire networks, or lithographically patterned metallic networks, for example. Such microwire, nanowire, or patterned networks may contain metals selected from Pt, Ni, Mo, W, or a combination thereof, for example.

Another option for the transparent first electrode is a sufficiently thin conductive film, such as a thin metal oxide film (e.g., nickel oxide or indium tin oxide) or a thin ceramic film (e.g., TiN). Such films may be deposited using atomic layer deposition or evaporation, for example. The transparent first electrode may entail more than one layer or film, such as a Ti adhesion layer and a Pt layer.

Another option for the transparent first electrode is a conductive monolayer of graphene or multiple layers of graphene, such as from 2 to 10 layers of graphene, for example.

In some embodiments, the first electrode is a porous electrically conductive structure. In some embodiments, the first electrode is a selectively permeable electrically conductive layer. For example, see U.S. Pat. No. 10,545,461 to Roper et al, which is incorporated by reference herein. In this patent application, "selectively permeable" refers to the transport of metal atoms through the electrode, by diffusion or conduction. In some embodiments, the first electrode is a mixed ion-electron conductor. For example, see U.S. Pat. No. 10,828,618 to Roper et al, which is incorporated by reference herein.

The first electrode is preferably a porous electrically conductive layer. The porous electrically conductive layer is preferably a patterned metal layer directly on one surface of the first ion conductor. The metal layer is preferably thin, such as less than 1 micron in thickness, more preferably less than 200 nanometers or less than 100 nanometers in thickness. The pattern of the metal layer is preferably such that metal regions are closely spaced, such as less than 100-micron line pitch, more preferably less than 10-micron line pitch, and most preferably less than 2-micron line pitch. In some embodiments, the patterned metal layer is a grid pattern. In some embodiments, the patterned metal layer is a stripe pattern. The metal layer may be patterned with photolithography, electron-beam lithography, direct-write lithography, direct-write metal deposition (e.g., ion beam-induced deposition), interference lithography, etc.

Exemplary electrode materials for the porous electrically conductive layer include Pt, Mo, W, Ni, Cu, Fe, Al, and combinations thereof. The porous electrically conductive layer may also entail more than one layer, such as a Ti adhesion layer and a Pt layer.

The porous electrically conductive layer preferably does not chemically interact with the ionic species conducted by the first ion conductor. For example, the porous electrically conductive layer preferably does not form an intermetallic phase and does not chemically react with the ionic species other than enabling electrochemical oxidation and reduction. Additionally, the porous electrically conductive layer preferably does not chemically interact with the first ion conductor itself, other than possible chemical bonding to adhere to the surface of the first ion conductor. For example, portions of the porous electrically conductive layer preferably do not form mobile ions that are transported to the first ion conductor.

In some embodiments, the first electrode has a high diffusivity for the metal atoms that are collimated. The metal atoms which comprise the atomic vapor have a diffusivity in the first electrode that is preferably at least about $10^{-10}$ cm$^2$/s and more preferably at least about $10^{-6}$ cm$^2$/s, measured at 25° C. or at a device operation temperature.

The first electrode is at least a fair electronic conductor. The electronic resistivity of the first electrode is preferably less than 10 kΩ·cm, more preferably less than 1 kΩ·cm, and most preferably less than 1 Ω·cm, measured at 25° C.

In some embodiments, the first electrode comprises an intercalation compound, which is a material capable of being intercalated with atoms of the atomic vapor. In some embodiments, the intercalation compound is graphite, $MoS_2$, $TaS_2$, or a combination thereof, for example. The intercalation compound may be disposed in a uniform layer that consists essentially of the intercalation compound and any intercalated atoms. The thickness of the intercalation compound layer is preferably less than 100 microns and more preferably less than 10 microns.

The first electrode may also include a region and/or layer with high electronic conductivity to minimize sheet resistance of the first electrode. For example, the first electrode may consist of two layers: a layer that is substantially graphite and a layer that is a porous electrically conductive layer, such as a thin platinum mesh. This layered configuration may be beneficial to ensure that the electrical potential, when applied, does not vary considerably (e.g., <0.1 V) across the electrode surface even if an intercalation material has mediocre electronic conductivity or if an intercalation material is very thin. The highly electrically conductive layer may include Pt, Mo, W, or a combination thereof. The highly electrically conductive layer may also entail more than one sub-layer, such as a Ti adhesion sub-layer and a Pt sub-layer. The highly electrically conductive layer preferably does not form an intermetallic phase with, or otherwise chemically react with, the ionic species. The highly electrically conductive layer preferably does not chemically interact with the first ion conductor.

In some embodiments, the first electrode is a mixed ion-electron conductor, which means that the first electrode is both an ion conductor and an electron conductor. The mixed ion-electron conductor preferably has an electrical sheet resistance less than 10 MΩ/□ (10 million ohms per square), more preferably less than 100 kΩ/□, and most preferably less than 1 kΩ/□. The electronic resistivity of the mixed ion-electron conductor is preferably less than 100 kΩ·cm, more preferably less than 10 kΩ·cm, and most preferably less than 100Ω·cm. The ionic conductivity of the mixed ion-electron conductor is preferably at least $10^{-12}\Omega^{-1}$ cm$^{-1}$, more preferably at least $10^{-9}\Omega^{-1}$ cm$^{-1}$, and most preferably at least $10^{-6}\Omega^{-1}$ cm$^{-1}$. The ionic conductance of the mixed ion-electron conductor, through the thickness of the electrode, is preferably less than 10 kΩ more preferably less than 1 kΩ and most preferably less than 100Ω.

Exemplary doped mixed ion-electron conductors include, but are not limited to, $Rb_{1-2x}M_xAlO_2$ (x is from 0 to less than 0.5) wherein M=Pb, Cd, and/or Ca; $Rb_{2-2x}Fe_{2-x}M_xO_4$ (x is from 0 to 1) wherein M=P, V, Nb and/or Ta; $Rb_{2-2x}Ga_{2-x}M_xO_4$ (x is from 0 to 1) wherein M=P, V, Nb and/or Ta; $Rb_{2-2x}Al_{2-x}M_xO_4$ wherein M=P, V, Nb and/or Ta; and $Rb_{1-x}Al_{1-x}M_xO_2$ (x is from 0 to less than 1) wherein M=Si, Ti, and/or Ge.

In some embodiments, the mixed ion-electron conductor material may be selected from alkali pyrophosphates, such as $Rb_4P_2O_7$. The alkali pyrophosphate is optionally doped with one or more atoms selected from Ca, Sr, Ba, Pb, Y, La, and/or Nd, for example. Exemplary compounds for the doped alkali pyrophosphates include, but are not limited to, $Rb_{4-2x}M_xP_2O_7$ (x is from 0 to less than 2) wherein M=Ca, Sr, Ba, and/or Pb; and $Rb_{3-3x}M_xPO_4$ (x is from 0 to less than 1) wherein M=Y, La, and/or Nd.

In some embodiments, the mixed ion-electron conductor is a uniform layer that consists essentially of the mixed ion-electron conductor. The thickness of the mixed ion-electron conductor material is preferably about 500 microns or less, and more preferably about 100 microns or less.

In some embodiments employing a mixed ion-electron conductor, the first electrode comprises a region or layer with high electronic conductivity to minimize the electrical sheet resistance of the first electrode. For example, the first electrode may include two layers: a layer that is a mixed ion-electron conductor and a layer that is a highly electrically conductive layer (e.g., a thin Pt mesh). The layered configuration allows for the electrical potential, when applied, to not vary considerably (e.g., <0.1 V) across the electrode surface even if the mixed ion-electron conductor has mediocre electronic conductivity or if the mixed ion-electron conductor is very thin. The highly electrically conductive layer may include Pt, Mo, W, or a combination thereof. The highly electrically conductive layer may itself include sub-layers, such as a Ti adhesion sub-layer and a Pt sub-layer. The highly electrically conductive layer preferably does not chemically interact with the ionic species and preferably does not form an intermetallic phase with the ionic species. Also, the highly electrically conductive layer preferably does not chemically interact with the first ion conductor. For example, when the highly electrically conductive layer contains Pt, preferably Pt' or other platinum ions do not become mobile ions within the first ion conductor.

The transparent first electrode is preferably designed to have a large amount of three-phase contact length. The three phases are electrode, ion conductor, and atomic vapor. Designs that can accomplish a high three-phase contact length include a high-density mesh or grid pattern, a porous material with an open porosity, a high-density parallel line pattern, and a nanowire array.

The transparent first electrode preferably does not chemically interact with the ionic species. For example, the transparent first electrode preferably does not form an intermetallic phase with the ionic species and does not chemically react with the ionic species.

The transparent first electrode preferably does not chemically interact with the ion conductor. Preferably, the transparent first electrode does not form mobile ions within the ion conductor. For example, when first-electrode materials include Pt, Ni, Mo, or W, mobile ions of Pt, Ni, Mo, or W are not formed within the ion conductor.

It is desirable that, when applied, an electrical potential does not vary considerably (e.g., <0.1 V) across the surface of the transparent first electrode. Thus, the electrode thickness is preferably selected as a function of the first-electrode material resistivity and the expected ionic current through the ion conductor.

The thickness of the transparent first electrode may be selected from about 10 nanometers to about 10 microns, such as from about 100 nanometers to about 1 micron, for example.

The second electrode is permits the conduction of electrons. The second electrode preferably is configured with an electrical connection and feedthrough through the chamber wall. The second electrode must not be in direct electrical contact with the first electrode.

The second electrode may or may not be transparent. In some embodiments, the second electrode is opaque or has a low transparency. In other embodiments, the second electrode is transparent, i.e. it is a transparent second electrode.

The transparent second electrode may be optically transparent at least at one wavelength selected from the infrared, visible, or ultraviolet electromagnetic spectrum, such as a selected wavelength from about 10 nm to about 1 mm, e.g. from about 100 nm to about 1000 nm. Preferably, the transparent second electrode is transparent in one or more selected wavelength bands, referred to as a transparency window (range of wavelengths). The wavelength bands may be in the infrared, visible, or ultraviolet ranges, or overlap (e.g., infrared and visible, or visible and ultraviolet). For typical atom cooling and trapping, the transparency window may be as small as 10 nm. More exotic applications may require a transparency window that is 100 nm or larger. For example, trapping Rb-87 (rubidium-87) using 1064 nm laser light may transparency require a window of ~300 nm and/or multiple transparency windows that encompass, for example, 1064 nm, 850 nm, 820 nm, and 800 nm. In some embodiments, a transparency window includes a frequency for atomic cloud imaging. In some embodiments, a transparency window includes a frequency for laser cooling. The selected transparency window for the transparent second electrode is preferably the same as the selected transparency window for the transparent first electrode and the ion conductor.

The optical transmission through the transparent second electrode (in embodiments for which the second electrode is transparent) in the selected transparency window is preferably at least 50%, more preferably at least 75%, and most preferably at least 90%. In various embodiments, the optical transmission through the transparent second electrode is at least 50%, 60%, 70%, 80%, 90%, or 95%. The optical transmission depends on the thickness of the transparent second electrode, generally in an inverse relationship. The thickness of the transparent second electrode, and the transparency window, are preferably selected together such that the optical transmission is at least 50%, preferably at least 75%, and most preferably at least 90%.

As noted earlier, the second electrode need not have high transparency or even any transparency. In some embodiments, rather than a transparent second electrode, a second electrode may be used that has less than 50% transparency, less than 25% transparency, less than 10% transparency, or no transparency (opaque) at the transparency window for the transparent first electrode and the ion conductor.

The second electrode is preferably in contact with the ion conductor. The second electrode is not in electrical contact with the first electrode. The second electrode may or may not be in contact with the vapor chamber volume.

The second electrode is or contains an atom reservoir for metal ions. The atom reservoir stores and transports neutral atoms. Transport of neutral atoms is preferably via diffusion, and storage of neutral atoms is preferably via intercalation.

In this specification, neutral atoms include excited states of atoms (e.g., neutral sodium $Na^0$ may be present as excited sodium Na*). An excited-state electron configuration of an atom occurs when a valence electron is promoted to a higher energy state, but the atom is still neutral unless an electron is lost or gained.

The atomic species contained within the atom reservoir are preferably a reduced form, and preferably a neutral form, of the same ionic species as in the ion conductor. Alternatively, or additionally, a different atomic species may be contained within the atom reservoir. For example, when the device is sourcing atoms, Na may be contained within the second electrode and may be oxidized, while Rb may be reduced at the transparent first electrode.

Note that the specific ions that are oxidized at the first electrode rarely are transported all the way to the second electrode. Although that is possible, more typically, the ions that enter the first electrode are different than the ions that leave the second electrode. They may be the same type of ionic species, but usually not the same ions.

The atom reservoir may contain graphite or another type of predominately $sp^2$-bonded carbon. Examples of $sp^2$-bonded carbon include, but are not limited to, graphite, monolayer graphene, few-layer graphene, graphene flakes, holey graphene (perforated graphene), carbon nanotubes, fullerenes (e.g., $C_{60}$, $C_{70}$, etc.), polyaromatic hydrocarbons (e.g., pentacene, rubrene, hexabenzocoronene, coronene, etc.), chemical-vapor-deposited graphitic carbon, pyrolyzed carbon-containing molecules or polymers include pyrolyzed parylenes, such as pyrolyzed poly(para-xylylene), analogues thereof, or combinations of the foregoing.

In some embodiments, the second electrode comprises particles of an intercalation compound in a matrix. The matrix is preferably a polymer binder, such as (but not limited to) poly(vinylpyrrolidone), poly(methacrylate), poly (methyl methacrylate), poly(ethyl methacrylate), poly(2-hydroxyethyl methacrylate), fluoroelastomers, cellulose resin, or a combination thereof. The polymer binder preferably has low outgassing at device operating temperature and is compatible with ultra-high vacuum. Matrix additives may be included to increase the electronic conductivity of the second electrode. For example, small conductive carbon particles may be included (e.g. Super-P® carbon black).

The atom reservoir may include a metal dichalcogenide. In various embodiments, the atom reservoir includes a transition metal oxide (e.g., ZnO), a transition metal sulfide (e.g., $MoS_2$ or $TaS_2$), a transition metal selenide (e.g., $TiSe_2$), or a transition metal telluride (e.g., $TiTe_2$).

The atom reservoir may be in the form of particles. It is preferable that the particles have at least one dimension that is relatively short to reduce the diffusion length for neutral atoms, thereby improving the transport rate. The particles of the atom reservoir may have a minimum dimension (e.g., diameter of spheres or rods) of less than 1000 microns, less than 500 microns, less than 100 microns, less than 50 microns, less than 10 microns, less than 5 microns, less than 1 micron, or less than 500 nanometers, for example. In preferred embodiments, the particles of the atom reservoir have a minimum dimension selected from about 100 nanometers to about 20 microns.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

The atom reservoir is preferably a continuous phase or a semi-continuous phase. For example, the atom reservoir may be or include a carbon aerogel, a carbonized polymer, or reticulated vitreous carbon foam.

In various embodiments, the electronic resistivity of the second electrode is preferably less than 10 k$\Omega$·cm, more preferably less than 1 k$\Omega$·cm, even more preferably less than 100 $\Omega$·cm, and most preferably less than 10 $\Omega$·cm, measured at 25° C.

The thickness of the second electrode may be selected from about 1 micron (or less) to about 100 microns (or more). Typically, the second electrode is thicker than the transparent first electrode.

In addition to the atom reservoir, the second electrode may contain one or more other phases to form a composite electrode. For example, see U.S. Pat. No. 10,545,461 to Roper et al, which has been incorporated by reference herein. An additional phase may be an atom-transporting phase that stores and transports neutral atoms. Transport of neutral atoms is preferably via diffusion. At a fixed point in time, neutral atoms may be in the process of being transported into or out of the atom-transporting phase, may be stored at a fixed location within the atom-transporting phase, or may be moving within the atom-transporting phase but not across its phase boundary, and therefore stored within that phase. Transport of neutral atoms within the atom-transporting phase and/or across its phase boundaries may occur via various diffusion mechanisms, such as (but not limited to) bulk solid diffusion, porous diffusion, surface diffusion, grain boundary diffusion, permeation, solubility-diffusion, etc. Storage of neutral atoms is preferably via intercalation. Storage of neutral atoms also results when the diffusion rate of metal atoms is negligible (e.g., less than $10^{-10}$ cm$^2$/s).

In the atom-transporting phase of the second electrode, the selected metal atoms may have a diffusion coefficient of at least about $10^{-10}$ cm$^2$/s, $10^{-9}$ cm$^2$/s, $10^{-8}$ cm$^2$/s, $10^{-7}$ cm$^2$/s, $10^{-6}$ cm$^2$/s, or $10^{-5}$ cm$^2$/s, measured at the device-operation temperature, such as 25° C., 100° C., 150° C., or 200° C. The metal-atom diffusion in the second electrode as a whole will depend on the bulk diffusivity of the atom-transporting phase, the volume fraction of the atom-transporting phase, and the connectivity/tortuosity of atom-transporting phase.

The atomic species contained in the atom-transporting phase is preferably the reduced (neutral charge) form of at least one of the ionic species contained in the ion conductor. Alternatively, or additionally, the atom-transporting phase may contain an atomic species that is different than the species contained in the ion conductor. For example, when the device is configured to source atoms, Na may be contained within the atom-transporting phase, Na may be oxidized to $Na^+$ at the second electrode, $Rb^+$ may be reduced to Rb at the first electrode, and the ion conductor may contain both $Na^+$ and $Rb^+$.

The atom-transporting phase and/or the atom reservoir preferably contain an intercalable compound that is capable of being intercalated by at least one element in ionic and/or neutral form. As used herein, an "intercalable compound" (or "intercalatable compound") is a host material that is capable of forming an intercalation compound with guest atoms which comprise the atomic vapor whose density is being controlled. Stated another way, the intercalable compound is intercalative for (capable of intercalating) at least some of the atoms in the atomic vapor. The guest atoms that are intercalated may be neutral atoms, ionic species, or a combination thereof. Typically, the guest atoms are intercalated as neutral atoms.

In some embodiments, the host material actually contains the guest species, resulting in a material which may be referred to as an "intercalation compound." It is noted that for the purposes of this patent application, any reference to intercalable compound may be replaced by intercalation compound, and vice-versa, since an intercalable compound must be capable of intercalating a guest species but may or may not actually contain the intercalated guest species.

"Intercalation" herein is not limited to the reversible inclusion or insertion of an atom, ion, or molecule sandwiched between layers present in a compound, which shall be referred to herein as "layer intercalation." Intercalation also includes absorption of neutral atoms or ionic species into a bulk phase of the compound, whether that phase is amorphous or crystalline; adsorption of neutral atoms or ionic species onto an outer surface or an internal surface (e.g., a phase boundary) present in the compound; and reversible chemical bonding between the neutral atoms or ionic species, and the compound.

Some embodiments of the invention utilize layer intercalation, in which a guest species such as K expands the van der Waals gap between sheets of a layered compound such as graphite. This layer expansion requires energy. Without being limited by theory, the energy may be supplied by electrical current to initiate charge transfer between the guest (e.g., K) and the host solid (e.g., graphite). In this example, potassium graphite compounds such as $KC_8$ and $KC_{24}$ may be formed. These compounds are reversible, so that when the electrical current is adjusted, the potassium graphite compounds may give up the intercalated atoms (K). Those previously intercalated atoms may be released into the vapor phase or into the ion conductor, for example. Electrical energy may be supplied to cause a chemical potential change at the interface with the intercalable compound, which then causes layer expansion.

In some embodiments, the intercalable compound is a carbonaceous material, such as a material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

The intercalable carbonaceous material may be at least 50 wt % carbon, preferably at least 75 wt % carbon, more preferably at least 90 wt % carbon, most preferably at least 95 wt % carbon. In some embodiments, the carbonaceous material is essentially pure carbon, except for impurities. The carbonaceous material may include mesoporous carbon, microporous carbon, nanoporous carbon, or a combination thereof.

The intercalable carbonaceous material may be a form of predominately $sp^2$ bonded carbon. Examples of $sp^2$ bonded carbon include, but are not limited to, graphite, graphene, carbon nanotubes, carbon fibers, fullerenes (e.g. $C_{60}$ or $C_{70}$), pyrolyzed carbon-containing molecules or polymers (such as pyrolyzed parylene, e.g. parylene-N, parylene-C, or parylene-AF-4), and large polyaromatic hydrocarbons (e.g. pentacene, rubrene, hexabenzocoronene, or coronene). In the case of graphene (which is essentially a single layer of graphite), the graphene may be monolayer graphene or multiple layers of graphene. Graphene flakes (a few layers of graphene) may be utilized. Certain embodiments utilize monolayer holey graphene, multiple layers of holey graphene, or graphene platelets.

In certain embodiments, the carbonaceous material comprises graphite. Graphite consists of planes of carbon sheets. Metal atoms, especially alkali atoms, readily intercalate between these carbon sheets, leading to a high diffusivity for those atoms. Graphite electrodes enable fast metal transport at low voltages and low power consumption per atom removed. Graphite not only transports atoms via intercalation, but also is electrically conductive due to the electron delocalization within the carbon layers. Valence electrons in the carbon are free to move, thereby conducting electricity through the graphite.

The graphite may be natural graphite (e.g., mined graphite) or synthetic graphite produced from various techniques. For example, graphite may be obtained from chemical-vapor-deposited graphitic carbon, carbide-derived graphite, recycled graphite, waste from graphene manufacture, and so on. Crystalline flake graphite occurs as isolated, flat, platelike particles with hexagonal edges if unbroken; when broken the edges can be irregular or angular. Amorphous graphite is very fine flake graphite. Lump graphite occurs in fissure veins or fractures and appears as massive platy intergrowths of fibrous or acicular crystalline aggregates. Highly oriented pyrolytic graphite is graphite with an angular spread between the graphite sheets of less than 1°.

The graphite may be crystalline, amorphous, or a combination thereof. The graphite crystallinity may range from about 10% to about 90%, for example. A mixture of crystalline and amorphous graphite may be beneficial for intercalation not only between crystal layers but also between crystalline and amorphous regions of the graphite. With too much crystallinity, the diffusivity becomes highly anisotropic. If highly crystalline (i.e. highly anisotropic) graphite is oriented with the low-diffusivity axis normal to the surface of the device (which is a typical orientation), reduced metal-atom flux, and thus reduced performance, would result.

In some embodiments, the intercalable compound of the atom-transporting phase is a transition-metal oxide, a transition-metal dichalcogenide, or a combination thereof. The intercalable compound may also be a mixture of a carbonaceous material and a transition-metal oxide, or a mixture of a carbonaceous material and a transition-metal dichalcogenide, or a mixture of all of these materials. Specifically, the intercalable compound may be a metal dichalcogenide selected from $MoS_2$, $TaS_2$, $TiTe_2$, or any other transition metal dioxide, disulfide, diselenide, or ditelluride.

The second electrode is preferably encapsulated by the ion conductor and reservoir walls, as shown in FIG. 1. The encapsulation may be a single encapsulate (e.g., ultrahigh vacuum epoxy) or a bonded substrate employing ultrahigh vacuum epoxy or thermocompression-bonded silicon, borosilicate glass, or alumina die, for example. The encapsulation may be a deposited thin film or thick film, such as from chemical-vapor-deposited silicon oxide, atomic-layer-deposited alumina, plasma-sprayed alumina, or a combination thereof.

A number of additional variations of the atomic instrument are possible.

The atomic instrument may be part of a system including a vacuum chamber, vacuum pumps, lasers, windows, optics, photodetectors, RF sources, etc. The atomic instrument may be an atomic physics instrument, such as (but not limited to) a clock, frequency source, accelerometer, gyroscope, gravimeter, electrometer, magnetometer, or gradiometer. The atomic instrument may be utilized for molecular-beam epitaxy or other semiconductor fabrication processes.

The atomic instrument may include a vapor chamber volume. The vapor chamber volume may be in contact with the first electrode and preferably is in contact with the ion conductor. The vapor chamber contains an atomic vapor, such as a vapor of an alkali metal or an alkaline earth metal, or another atomic metal, such as a rare earth metal (e.g., Yb) or mercury. The atomic vapor may be isotopically enriched or purified. The vapor chamber may be under partial vacuum and may contain nothing in addition to the atomic vapor. In some embodiments, the vapor chamber contains additional gases, such as $N_2$, $CH_4$, He, Ar, Ne, Xe, or $NH_3$. The additional gases may be used as a buffer gas or as spin exchange gas, for example. The additional gases may be isotopically enriched or purified.

The first electrode may be in contact with the first ion conductor, in contact with a vapor chamber volume, or in contact with both the ion conductor and a vapor chamber volume. The second electrode may or may not be in contact with the vapor chamber volume.

The vapor chamber may be hermetically sealed or may be in fluid communication with a larger system. For example, the vapor chamber may be part of a high-vacuum system containing pumps, pressure/vacuum gauges, atom dispensers, getters, getter pumps, etc.

The electrochemically cleanable window is substantially transparent at relevant wavelengths such that there is an optical path through the vapor chamber. In some embodiments, there are three orthogonal optical paths to facilitate the formation of a magneto-optical trap (MOT) and atomic cloud imaging. The optical paths do not need to be orthogonal when entering a vapor chamber. For example, there could be mirrors inside the vapor chamber that make the optical paths orthogonal only inside the vapor chamber. There could be one optical path entering the chamber, which optical path is split within the vapor chamber. In some embodiments, within the vapor chamber, along three different orthogonal axes based on the location of trapped atoms, two optical paths (one in each direction) are located on each of the three axes.

An "optical path" is the path of a spectroscopic probing beam of light (or other type of laser beam) into a vapor chamber. The optical path is optional in the sense that the device itself does not inherently include the beam of light, while operation of a device (in some embodiments) at least periodically means that an optical path is traversing into or through the vapor chamber. Also note that an optical path is not necessarily a straight line. Internal reflectors or refractive elements may be included in the system, so that optical reflection occurs. In that case, the optical beam could enter and exit along the same wall (detection probe on the same side as the laser source), for example.

It shall be understood that laser beams may or may not be present in any device described in this specification. That is, a source of laser beams may be present but not operating, in which case no laser beams will enter or be present within the vapor chamber. Or a vapor chamber may be provided without a source of laser beams, which source may be added at a later time, prior to operation of the device. Likewise, magnetic field sources (external to the device) and magnetic field lines (within the device) may or may not be actually present.

The chamber walls may be opaque, as depicted in FIG. 1. Chamber walls may be fabricated from silicon, $SiO_2$, fused silica, quartz, pyrex, metals, dielectrics, or a combination thereof, for example.

Optionally, the chamber walls may be transparent or somewhat transparent, but that is not necessary, due to the presence of the electrochemically cleanable window in the atomic instrument.

In certain embodiments, there are multiple electrochemically cleanable windows. For example, the atomic instrument depicted in FIG. 1 may be modified to contain an electrochemically cleanable window on two sides, three sides, or all four sides of the vapor chamber. Or, a single side of the vapor chamber may include two or more distinct electrochemically cleanable windows, each with its own first and second electrodes and ion conductors.

The atom reservoir may be designed to accommodate mechanical strain from a changing reservoir volume due to the loss or introduction of atoms. For instance, a gap may be situated between an intercalation compound and the reservoir walls to permit expansion of the intercalation compound without straining the reservoir walls. The reservoir walls may be designed to elastically and/or plastically deform. This configuration may be accomplished through material selection (e.g. metals, polymers, or a combination thereof). Alternatively, or additionally, this configuration may be accomplished through reservoir design (e.g. a bellows).

The reservoir walls are preferably impermeable to the atomic species contained inside the reservoir. The walls are preferably thin films and supported by a substrate (e.g. glass, Si, alumina, etc.). The side(s) of the reservoir walls that face the interior of the reservoir preferably do not chemically interact with the ionic species. For example, the reservoir walls do not form an intermetallic phase with the ionic species and do not chemically react with the ionic species. Exemplary reservoir wall materials include Pt, Mo, W, or a combination thereof, for the walls that face the interior of the reservoir. When there are side(s) of the reservoir walls that touch the ion conductor, the reservoir walls preferably do not chemically interact with the ion conductor, other than chemical bonding to adhere to the first ion conductor. Exemplary reservoir wall materials include Pt, Mo, W, or a combination thereof, for the walls (if any) that touch the ion conductor.

An atomic instrument may include an additional atom reservoir that is distinct from the atom reservoir of the second electrode. This additional atom reservoir is preferably in contact with the second electrode. The atom reservoir may be comprised, in part or in whole, by graphite or graphitic carbon. The graphite or graphitic carbon provides electronic conductivity and also a means of storing atoms, such as in a graphite intercalation compound. The additional atom reservoir may contain metal in the vapor phase and possibly in solid and/or liquid phases as well. The atomic species contained within the atom reservoir is preferably the reduced form of the same ionic species as in the ion conductor. Alternatively, a different atomic species may be contained within the additional atom reservoir.

Multiple ion conductors, each configured with their own electrodes, may be present in a single atomic instrument. Multiple first electrodes may or may not be electrically connected through electrical leads or electrical traces. Likewise, multiple second electrodes may or may not be electrically connected through electrical leads or electrical traces. When there are additional electrodes beyond the first electrode and second electrode, the additional electrodes may or may not be optically transparent.

Multiple sets of first electrodes, ion conductors, and second electrodes may generally be present. In some embodiments, two or more first (front) electrodes are employed. In these or other embodiments, two or more second (back) electrodes are employed. In any of these embodiments, or other embodiments, two or more ion conductors are employed.

Each electrode in the atom instrument is typically connected to an electrical lead fabricated from an electrically conductive material. A lead is an electrical connection consisting of a length of wire, metal pad, metal trace, or other electrically conductive structure. Leads are used to transfer power and may also provide physical support and potentially provide a heat sink. In some embodiments, a device is provided without such leads, which may be added at a later time, before use.

There are many options for the electrical connections to the first and second electrodes of the atomic instrument. The electrical connections may be connected to bond pads for connection to an external circuit. The electrical connections may include through-wafer vias, patterned electrically conductive thin films, doped regions of semiconductors, wire bonds, or a combination thereof. Patterned thin films may be parallel with the first electrode, such as when the first electrode is substantially flat. Parts of patterned thin films may be at an angle with the first electrode. In some embodiments, the electrode connections travel out of the plane of the electrode to which it is connected.

The atomic instrument may be contained within an oven. The purpose of the oven may be to control the temperature of the atomic instrument at a temperature above ambient temperature, for example. In principle, the atomic instrument may be contained within any sort of temperature-controlled system, for heating or cooling the device.

The atomic instrument may be operated at a wide range of temperatures and pressures. In various embodiments, the atomic instrument may be operated at a temperature from about $-200°$ C. to about $500°$ C., preferably from about $-50°$ C. to about $250°$ C., and more preferably from about $10°$ C. to about $200°$ C. After atoms are emitted from the atomic instrument, those atoms may be cooled to ultra-low temperatures (e.g., $10^{-7}$ K to $10^{-3}$ K) as needed for certain applications or measurements. In various embodiments, the atomic instrument may be operated at a pressure from about 7600 torr (10 atm) to about $10^{-14}$ torr, preferably from about $10^{-3}$ to about $10^{-13}$ torr, and more preferably from about $10^{-7}$ torr to about $10^{-12}$ torr.

The atomic instrument may include an integrated heater. The integrated heater may be a resistive heater, such as a thin wire or a patterned thin metal trace (e.g. Pt or nickel-chromium alloy). The integrated heater may also be a radiative heater or a thermoelectric heater, for example. The integrated heater preferably includes a temperature sensor, such as a thermocouple or a resistance temperature detector (e.g., Pt). Preferably, the heater is in good thermal communication with the region of the ion conductor that is near the first electrode.

In some embodiments, the atomic instrument is a chip-scale device that is mounted or integrated on a microelectromechanical systems (MEMS) heater stage to minimize heater power.

When an integrated heater is included in the atomic instrument, the heater may further comprise one or more thermal isolation structures. A thermal isolation structure minimizes heat transfer from the heated region of the device to the colder, ambient environment. A thermal isolation structure is configured to minimize heat loss out of the heated region into a cold region, by functioning as insulation to retain heat within the heated region. The thermal isolation structure preferably has a high value of thermal resistance, as further explained below.

A thermal isolation structure may be made of the same material and layer as the atom reservoir walls, in some embodiments. In these or other embodiments, a thermal isolation structure may be made of the same material and layer as the ion conductor. The thermal isolation structure is preferably polymer, ceramic, or glass, although metal may be utilized as well, or a combination of the foregoing.

In some embodiments, the thermal isolation structure is fabricated from a material selected from the group consisting of β-alumina (e.g., Rb-β-alumina, Na-β-alumina, or Sr-β-alumina), β"-alumina (e.g., Rb-β"-alumina, Na-β"-alumina, or Sr-β"-alumina), α-alumina, silica, fused silica, quartz, borosilicate glass, silicon, silicon nitride, silicon carbide, and combinations thereof.

The thermal isolation structure may be designed to accommodate materials with any thermal conductivity. High-thermal-conductivity materials will benefit from long, high-aspect ratio connections, while lower-thermal-conductivity materials may utilize shorter, stubbier connections.

An important design parameter for the thermal isolation structure (when present) is the thermal resistance. The thermal resistance is the temperature difference across the thermal isolation structure when a unit of heat energy flows through it in unit time; or equivalently, the temperature difference, at steady state, between two defined surfaces of the thermal isolation structure that induces a unit heat flow rate. Because the desire is for a low heat flow rate, a high temperature difference is desired, i.e., a high value of thermal resistance. The thermal resistance of a thermal isolation structure is preferably at least 100 K/W, more preferably at least 1,000 K/W, and most preferably at least 10,000 K/W.

A thermal isolation structure may also be configured to impart mechanical strain relief, thereby preventing mechanical damage due to thermal strains that build up when the ion conductor is heated to a higher temperature than the base substrate. In some embodiments, a thermal isolation structure is mechanically connected to a base substrate, for example through a frame. Preferably, the thermal isolation structure is designed to reduce thermal stress or residual stress by at least 2×, preferably at least 10×, and more preferably at least 100× from one side of the thermal isolation structure to the other side. The thermal or residual stress reduction is a function of the geometric design of the thermal isolation structure and its material properties.

In some embodiments, a thermal isolation structure is a suspension beam. Typically, a plurality of suspension beams will be present to connect the heated region to the cold region. The heated region only contacts the cold region through the suspension beams. The suspension beams may be straight beams, folded beams, tortuous beams, circular beams, and so on. The suspension beams may be made in any one (or more) layers in a planar process, such as surface or bulk micromachining. The rest of the heated region may be surrounded by vacuum or a vapor phase (e.g., containing an inert gas), either of which has a high thermal resistance to the cold region. As an alternative, the vapor/vacuum region may include a thermal insulator material, such as an aerogel.

In some embodiments, a thermal isolation structure has a thin metal film patterned on it for electrical interconnections. In some preferred embodiments, a resistive heater and a temperature sensor are patterned on (in contact with) the same layer as at least one thermal isolation structure. Preferably, electrical connections to the heater and the temperature sensor are also patterned on one or more thermal isolation structures. Optionally, part or all of the heater may be patterned on a thermal isolation structure or on multiple thermal isolation structures. In some embodiments, a thin film resistive heater is patterned on one or more sides of the same layer as a thermal isolation structure. In cases where the first ion conductor is separate from the thermal isolation structure, the heater may be patterned on the same side or the opposite side of the thermal isolation structure compared to the position of the ion conductor. In cases where the ion conductor is the same as a thermal isolation structure, or a layer thereof, the heater may be patterned on either side of the ion conductor. See commonly owned U.S. patent application Ser. No. 16/573,684, filed on Sep. 17, 2019, which is hereby incorporated by reference herein.

In some embodiments, integration of a heater and thermal isolation structures within the atomic instrument enables low system power input. The power input for controlling vapor density of metal atoms is preferably less than about 500 mW, more preferably less than about 200 mW, and most preferably less than about 100 mW. In various embodiments, the system power input for sourcing and/or sinking metal atoms is about 1000, 500, 400, 300, 200, 100, 50, 25, or 10 mW.

In some atomic instruments in which high vapor density is desirable, the density of metal atoms may be at least $10^9$ atoms per cm$^3$, preferably at least $10^{10}$ per cm$^3$, and more preferably at least $10^{11}$ per cm$^3$. In some atomic instruments in which low vapor density is desirable, the density of metal atoms may be below $10^8$ atoms per cm$^3$, preferably below $10^7$ atoms per cm$^3$. In various embodiments, the density of metal atoms if about, at least about, or at most about $10^6$ atoms per cm$^3$, $10^7$ atoms per cm$^3$, $10^8$ atoms per cm$^3$, $10^9$ atoms per cm$^3$, $10^{10}$ atoms per cm$^3$, $10^{11}$ atoms per cm$^3$, or $10^{12}$ atoms per cm$^3$.

The atomic instrument may be situated inside a magnetic field. Coils of wire driven in an anti-Helmholtz configuration surrounding the vapor cell can be used to generate magnetic fields required for a trap. Other magnetic-field sources (such as magnets or materials capable of generating magnetic flux) may be utilized to generate magnetic fields within the atomic instrument.

The atomic instrument may be fabricated on a wide variety of length scales. The length scale may be characterized by the square root of the first electrode area. This length scale may vary from 10 m to 1 micron, with 1 m to 10 mm being typical for macroscale atomic timing and navigation systems, and 30 mm to 10 microns being typical for chip-scale atomic timing and navigation systems.

Chip-scale atomic instruments are preferably constructed using microfabrication techniques, including some or all of lithography, evaporation, shadow-masking, evaporation, sputtering, wafer bonding, die bonding, anodic bonding, glass frit bonding, metal-metal bonding, and etching.

The atomic instrument may also contain an atom chip for intra-system generation of magnetic fields for microtraps. Combining the atomic instrument with an atom chip provides for device miniaturization. An atom chip may be disposed on the ion conductor, or on a different surface than the ion conductor. The atom chip and the ion conductor need not be the same size. An atom chip may be fabricated on a base chip that is heterogeneously integrated with the ion conductor. The atom chip may be closer to the vapor volume than the ion conductor, in which case the vapor atoms may pass around the edges of the atom chip or through one of more holes in the atom chip, for example. The ion conductor may be closer to the vapor volume than the atom chip, in which case the trapped population of cold atoms may be situated above the ion conductor. Alternatively, or additionally, an atom chip may be fabricated directly on the first electrode. The atom chip traces that generate the magnetic fields for microtraps may be adjacent to the first electrode traces in this case. The atom chip traces that generate the magnetic fields for microtraps may be separated from the ion conductor by a material which is both an electronic insulator and an ionic insulator (e.g., glass materials).

In various embodiments, the applied voltage between first and second electrodes is about 10 mV, 25 mV, 50 mV, 100 mV, 200 mV, 300 mV, 400 mV, or 450 mV, or about 0.5 V, 1 V, 5 V, 10 V, 20 V, 50 V, 75 V, or 100 V.

The power input for sourcing metal atoms is preferably less than about 500 mW, more preferably less than about 200 mW, and most preferably less than about 100 mW. In various embodiments, the device power input for sourcing metal atoms is about 500 mW, 400 mW, 300 mW, 200 mW, 100 mW, 75 mW, 50 mW, 25 mW, or 10 mW, or less.

Fast system response times may be achieved with the atomic instrument. The atomic instrument response time (for sourcing metal atoms) may be less than about 10 seconds. In various embodiments, the atomic instrument response time is about 10, 5, 1, 0.5, 0.2, 0.1, 0.05, 0.04, 0.03, 0.02, or 0.01 seconds. The atomic instrument may be operated on longer time scales, such as about 1 minute, 10 minutes, 1 hour, 1 day, or even longer.

In some methods of using an atomic instrument, atom pulsing is desirable. In these embodiments, the atom source may be electrochemically switched on and off, repeatedly, to pulse an atomic beam. In conventional beam sources, switching requires significantly cooling the atom source which is very slow (typically at least 1 hour) or physically shuttering which is complex, not reliable, and eventually leads to mechanical failure. Switching the beam source can save atoms (longer device lifetime), reduce power, and reduce excess atomic vapor for longer cold atom lifetimes.

The atomic instrument does not necessarily use an atomic beam. The atomic instrument may employ a vapor cell or a vacuum system with another non-beam source of atoms, for example.

The atomic instrument may be used in various applications, including (but not limited to) portable atomic instruments, sensors, atomic clocks, gyroscopes, thin-film evaporation, molecular-beam epitaxy, atomic-layer deposition, and semiconductor surface doping. In some embodiments, the atomic instrument is arranged to supply multiple atoms for the purposes of one or more measurements based on those atoms. Measurements are usually spectroscopy-based, using lasers and/or RF to measure an external field or an energy level of the atoms. The atomic instrument may be, or be contained within, a vapor cell, a cold atom system, an atom chip, an atom gyroscope, an atomic clock, a communication system switch or buffer, a single-photon generator or detector, a gas-phase atom sensor, a nonlinear frequency generator, a precision spectroscopy instrument, an accelerometer, a gyroscope, an atom interferometer, a magneto-optical trap, an atomic-cloud imaging apparatus, or an atom dispenser system, for example.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An transparent and electrochemically cleanable window comprising:
   (a) a first electrode, wherein said first electrode is optically transparent;
   (b) a second electrode that is electrically isolated from said first electrode, wherein said second electrode is or contains an atom reservoir for first metal ions;
   (c) an ion conductor interposed between said first electrode and a second electrode, wherein said ion conductor is capable of transporting second metal ions, wherein said ion conductor is in contact with said first electrode and with said second electrode, and wherein said ion conductor is optically transparent; and
   (d) a transparent window support in contact with said ion conductor, wherein said transparent window support is optically transparent.

2. The transparent and electrochemically cleanable window of claim 1, wherein an adsorbed and/or condensed metal is disposed on a surface of said transparent and electrochemically cleanable window, and wherein said adsorbed and/or condensed metal comprises said first metal ions, a neutral form of said first metal ions, said second metal ions, a neutral form of said second metal ions, or a combination thereof.

3. The transparent and electrochemically cleanable window of claim 2, wherein said transparent and electrochemically cleanable window is configured such that when a voltage is applied between said first electrode and said second electrode, (i) said adsorbed and/or condensed metal is oxidized to said first metal ions and/or said second metal ions, and (ii) said first metal ions and/or said second metal ions are conducted through said ion conductor.

4. The transparent and electrochemically cleanable window of claim 1, wherein said transparent and electrochemically cleanable window does not contain, on a surface thereof, an adsorbed and/or condensed metal comprising said first metal ions, a neutral form of said first metal ions, said second metal ions, a neutral form of said second metal ions, or a combination thereof.

5. The transparent and electrochemically cleanable window of claim 1, wherein said first metal ions and said second metal ions are independently selected from the group consisting of alkali metal ions, alkaline earth metal ions, rare earth metal ions, and mercury ions.

6. The transparent and electrochemically cleanable window of claim 1, wherein said transparent and electrochemically cleanable window is optically transparent in one or more wavelength bands selected from infrared, and visible, and ultraviolet.

7. The transparent and electrochemically cleanable window of claim 6, wherein said transparent and electrochemically cleanable window has a transmission of at least 90% in said one or more wavelength bands.

8. The transparent and electrochemically cleanable window of claim 1, wherein said first electrode contains an electrode material selected from the group consisting of indium tin oxide, antimony tin oxide, zinc tin oxide, and combinations thereof.

9. The transparent and electrochemically cleanable window of claim 1, wherein said first electrode contains monolayer graphene or multilayer graphene.

10. The transparent and electrochemically cleanable window of claim 1, wherein said first electrode contains a metal microwire network, a metal nanowire network, or a lithographically patterned metal network.

11. The transparent and electrochemically cleanable window of claim 1, wherein said first electrode contains a thin metal film with a film thickness selected from about 2 nanometers to about 2000 nanometers.

12. The transparent and electrochemically cleanable window of claim 1, wherein said ion conductor comprises a solid electrolyte.

13. The transparent and electrochemically cleanable window of claim 12, wherein said solid electrolyte is selected from the group consisting of β-alumina, β"-alumina, NASICON, LISICON, KSICON, chalcogenide glasses, and combinations thereof.

14. The transparent and electrochemically cleanable window of claim 1, wherein said second electrode is opaque.

15. The transparent and electrochemically cleanable window of claim 1, wherein said second electrode is optically transparent.

16. The transparent and electrochemically cleanable window of claim 1, wherein said second electrode contains a carbonaceous material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

17. The transparent and electrochemically cleanable window of claim 1, wherein said second electrode is encapsulated by said ion conductor and a reservoir wall.

18. The transparent and electrochemically cleanable window of claim 1, wherein said ion conductor, said first electrode, and said second electrode are mechanically supported by said transparent window support.

19. The transparent and electrochemically cleanable window of claim 1, wherein said transparent and electrochemically cleanable window is present within an atomic instrument.

20. The transparent and electrochemically cleanable window of claim 19, wherein said atomic instrument further comprises opaque chamber walls, and wherein said transparent and electrochemically cleanable window is hermetically sealed with a portion of said opaque chamber walls.

* * * * *